J. D. TEW.
SOFT BASE VULCANIZING TUBE.
APPLICATION FILED MAR. 17, 1917.

1,270,345.

Patented June 25, 1918.

INVENTOR.
James D. Tew
BY Robert M. Pierson
ATTORNEY

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

SOFT-BASE VULCANIZING-TUBE.

1,270,345. Specification of Letters Patent. Patented June 25, 1918.

Application filed March 17, 1917. Serial No. 155,564.

*To all whom it may concern:*

Be it known that I, JAMES D. TEW, a citizen of the United States, residing at Akron, in the county of Summit and State of Ohio, have invented certain new and useful Improvements in Soft-Base Vulcanizing-Tubes, of which the following is a specification.

This invention relates to bags or tubes employed in the vulcanization of pneumatic tire casings and adapted to be distended by fluid pressure in order to stretch the casing and hold the same expanded against the outer mold during the cure, an example of such devices being shown in my Patent No. 1,137,097 of April 27, 1915. These bags, which are commonly made of rubber and fabric, become somewhat stretched or enlarged in cross-section through continued use, and owing to the fact that they have to be collapsed by a vacuum or otherwise in order to get them into the tire, there is usually a wrinkle or fold formed somewhere in the wall of the tube which does not entirely disappear when the tube is distended. If this wrinkle occurs in a part of the tube in contact with the casing, a corresponding ridge will be formed on the inner wall of the latter unless provision is made for covering the wrinkle. This has been done in practice by means of a flap or shield which, however, adds to the expense of the tube. As it is desirable to have the tube wall in contact with the tire casing relatively thick and stiff in order properly to mold the inner side of the casing, and as the exterior of said wall in fact becomes hardened by over-vulcanization during continued use, a wrinkle formed in such a wall and subjected to repeated bendings soon tends to make a crack in the wall which destroys the usefulness of the tube.

The object of my invention is to avoid the formation of wrinkles subject to flexure or bending, in the part of the tube wall in contact with the tire casing, and to do away with the use of shields, flaps and other accessories. To this end I provide a tube having a relatively soft and flexible base, which will bend and allow the sides of the tube to approach or come together when the vacuum is applied to collapse it, without substantially wrinkling the sides or tread wall, and which will flatten out against the inner ring of the tire mold when the inflating pressure is applied, any permanent wrinkle that may form being located in this base wall, which remains comparatively soft and flexible. Tube failures with their resulting expense and trouble are thereby considerably reduced.

Of the accompanying drawings.

Figure 1:
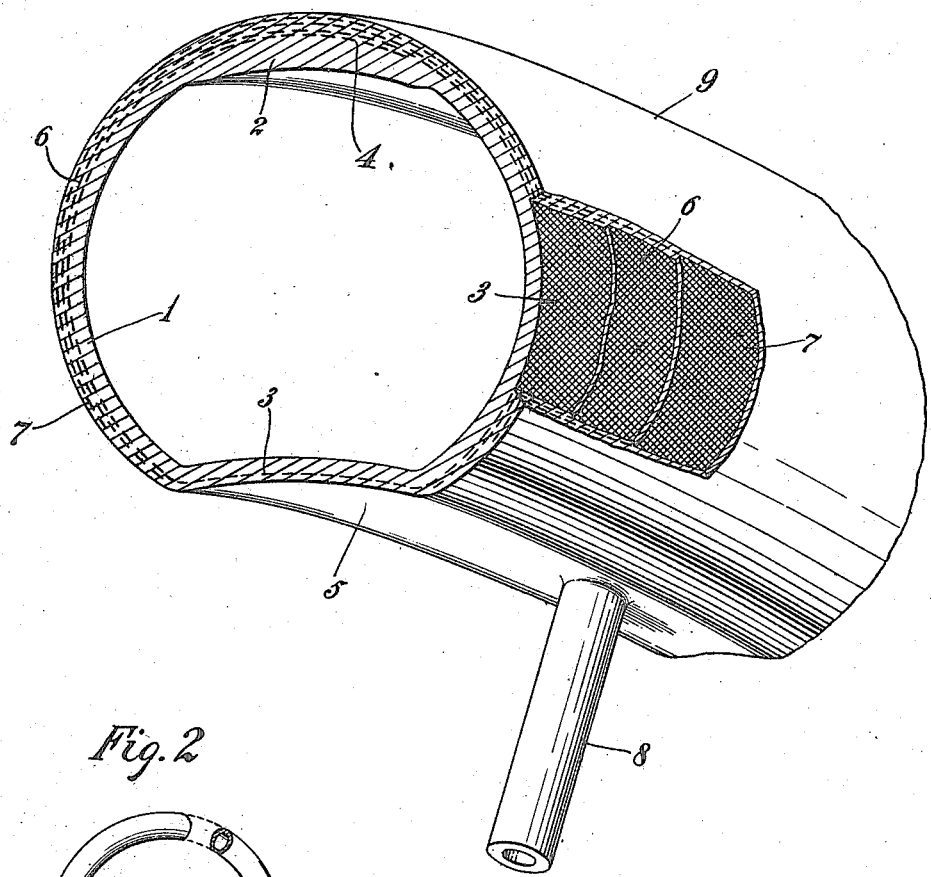
Figure 1 is a sectional perspective view of a vulcanizing tube constructed according to my invention.
Figure 2:
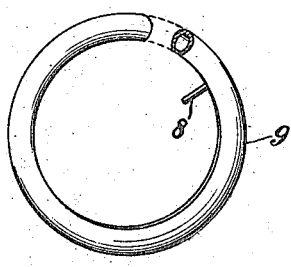
Fig. 2 is a perspective view of the entire tube, partly broken away, on a reduced scale.

The tube, represented as a whole by the number 9, is preferably built on a straight mandrel, and its ends spliced after removing it from the mandrel in order to give it the desired annular form. First a layer of soft rubber compound to form the impervious lining 1 of the tube is laid upon the mandrel, and its edges overlapped at the tread as represented by the thickened portion 2 in the finished tube. This rubber layer is then completely enwrapped by a layer of bias-cut frictioned fabric 3, which forms a reinforcement in both the base and side walls, and has its edges overlapped at the tread as shown at 4. It is a matter of convenience rather than necessity to have the fabric reinforcement in the base continuous or in one piece with the innermost ply of fabric in the side and tread walls. Preferably this innermost fabric layer is the only reinforcement which extends through the base-wall 5 of the tube, thus attaining the maximum of flexibility combined with the necessary strength.

A second layer 6 of bias-cut frictioned fabric is then laid over the first layer 3 but is not completely wrapped around the tube at the base, its edges terminating at or near the margins of the base wall 5. Then a third layer of bias-cut frictioned fabric 7 is laid upon the second layer 6 and its edges are preferably terminated some distance up the side walls, short of the base wall, thus tapering the thickness of the tube wall where the sides merge into the base. Obviously any one of the three fabric layers could be the one to form a complete tubular layer reinforcing the base wall, and the total number of fabric layers could be varied, although I find three of them, in the arrangement shown, to afford the most desirable construction. 8 is the branch inflating tube or nipple.

After the built-up tube has been removed from the mandrel and has had its ends spliced, it is vulcanized under internal fluid pressure in a mold of the proper size, the result being a tire-vulcanizing tube or bag having relatively thick side and tread walls which become increasingly hard on the outside by over-vulcanization in use, together with a relatively soft and flexible base wall adapted to bend inwardly and permit the sides to come together when the tube is collapsed by a vacuum, and also adapted to contain any permanent wrinkle which may form in the tube when the latter is fully distended, the base wall when distended being adapted to lie flat against the inner mold ring, except for such permanent wrinkle as may thus form. The tube is made in the first place approximately of a size to completely fill the tire casing in an inflated condition without wrinkling, and it will be understood that any permanent wrinkle which forms by reason of stretching of the tube occupies a relatively small part of the width of the base.

I claim:

1. An annular tire-vulcanizing tube having a fabric reinforced body and an integral relatively soft and flexible base.

2. An annular tire-vulcanizing tube composed of vulcanized rubber integrally reinforced with fabric, the fabric reinforcement of said tube being relatively thinner in the base than in the tread and side walls.

3. An annular tire-vulcanizing tube having a rubber lining and a plurality of layers of reinforcing fabric superimposed thereon at the tread and side walls and integrally vulcanized therewith, the base wall being relatively soft and flexible.

4. An annular tire-vulcanizing tube having a rubber lining, a relatively soft and flexible base wall provided with a single layer of reinforcing fabric, and a plurality of superimposed layers of reinforcing fabric in the tread and side walls, all parts being integrally vulcanized together.

In testimony whereof I have hereunto set my hand this 15th day of March, 1917.

JAMES D. TEW.

Copies of this patent may be obtained for five cents each, by addressing the "Commissioner of Patents, Washington, D. C."